United States Patent
Graf et al.

(10) Patent No.: US 6,718,247 B1
(45) Date of Patent: Apr. 6, 2004

(54) CONTROL METHOD AND SYSTEM FOR AN INFINITELY VARIABLE AUTOMATIC AUTOMOBILE TRANSMISSION

(75) Inventors: Friedrich Graf, Sinzing (DE); Kai Heesche, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/830,168
(22) PCT Filed: Oct. 1, 1999
(86) PCT No.: PCT/DE99/03183
§ 371 (c)(1),
(2), (4) Date: Apr. 23, 2001
(87) PCT Pub. No.: WO00/25042
PCT Pub. Date: May 4, 2000

(30) Foreign Application Priority Data

Oct. 23, 1998 (DE) .......................................... 198 49 038

(51) Int. Cl.⁷ .............................................. F16H 61/02
(52) U.S. Cl. .............................. 701/51; 701/55; 701/56; 477/143; 477/155
(58) Field of Search ............................... 701/57, 51, 52, 701/55, 56; 477/143, 155

(56) References Cited

U.S. PATENT DOCUMENTS 6,006,151 A * 12/1999 Graf ............................ 701/57

FOREIGN PATENT DOCUMENTS

| DE | 41 20 540 C1 | 6/1991 |
|---|---|---|
| DE | 42 39 133 C1 | 11/1992 |
| DE | 43 30 391 A1 | 9/1993 |
| DE | 44 11 938 A1 | 4/1994 |
| DE | 44 41 878 A1 | 11/1994 |
| DE | 196 45 975 A1 | 11/1996 |
| DE | 197 52 623 A1 | 11/1997 |
| EP | 0 576 703 A1 | 6/1992 |
| EP | 0 848 191 A1 | 6/1998 |

OTHER PUBLICATIONS

SAE–Paper 9636321 Keiji Sato et al., Development of electronically controlled CVT System equipped with CVTip, SAE conference CVT 96, Yokohama.

* cited by examiner

Primary Examiner—Thomas G. Black
Assistant Examiner—Arthur D. Donnelly
(74) Attorney, Agent, or Firm—Morrison & Foerster LLP

(57) ABSTRACT

In the method, the transmission ratio of the speed transmission (i_act) is set automatically using stored adjustment characteristic curves, as a function of a variable (FP, tv) which characterizes the engine output, and a variable (v) which characterizes the vehicle speed. The transmission ratio is varied as required by means of a manual intervention by the driver. The transmission ratio of the speed transmission is set as a stepped deviation from a setpoint engine speed (n_eng).

18 Claims, 4 Drawing Sheets

CONTROL METHOD AND SYSTEM FOR AN INFINITELY VARIABLE AUTOMATIC AUTOMOBILE TRANSMISSION

This application claims priority to International Application No. PCT/DE99/03183 which was published in the German language on Oct. 1, 1999.

TECHNICAL FIELD OF THE INVENTION

The invention relates to a system and method for controlling a vehicle speed transmission, and in particular, for controlling a continuously variable automatic motor vehicle speed transmission.

Conventional control systems for infinitely variable motor vehicle speed transmissions, referred to as CVT control systems, set the setpoint operating point of the speed transmission, which corresponds to a setpoint engine speed, as a function of the accelerator pedal value or of the resulting setpoint engine torque. The control system contains at least two adjustment characteristic curves: one which is configured for an economical, i.e. fuel-saving-operating mode and another which is configured for a driving performance-oriented, sporty operating mode of the motor vehicle. The latter brings about relatively high engine speeds—corresponding to a relatively small transmission ratio—with the same accelerator pedal position, with the result that the driver is provided with a larger margin in terms of the engine torque or accelerator pedal. In such a case, given the same engine output the driver does not need to deflect the accelerator pedal to the same extent as a control operating using the adjustment characteristic curve for the economical operating mode.

In a known method for operating a vehicle with CVT (DE 43 30 391 A1), the transmission ratio of the speed transmission is continuously adjusted using a manually operated activation device, the adjustment of the transmission ratio taking place within the limits of a maximum transmission ratio and a minimum transmission ratio until the manual activation takes place (Tip operating mode).

CVTs which are controlled in this way are technically very flexible but assume that there is a readiness to shift the gears on the part of the driver. Continuous adjustment of the speed transmission ratio contributes, on the one hand, to keeping the engine in the operating range which is the most favorable for consumption, but on the other hand the driver is totally unaccustomed to keeping the engine speed constant, a characteristic which is also known as the "scooter effect". Many drivers prefer the accustomed acoustic characteristics of a motor vehicle with a multi-step reduction gear, especially the association between the engine speed and the travel speed which is perceptible with a multi-step reduction gear. This applies in particular to drivers who prefer a "sporty" driving style.

In a method of the generic type for controlling an infinitely variable automatic motor vehicle speed transmission, the transmission ratio can be varied as required by means of a manual intervention by the driver (EP 0 848 191 A1). In manual mode, the transmission ratio is controlled here along predefined setpoint trajectories in order to avoid relatively large engine speed jumps.

SUMMARY OF THE INVENTION

In one embodiment of the invention, there is a method for controlling an infinitely variable automatic motor vehicle speed transmission. The method includes, for example, automatically setting the transmission ratio of the speed transmission using stored adjustment characteristic curves as a function of a variable which characterizes the engine output, and a variable which characterizes the vehicle speed, and varying the transmission ratio by manual intervention by the driver. The transmission ratio of the speed transmission is set as a stepped deviation from a setpoint engine speed.

In one aspect of the invention, the deviation is subtracted in the case of a positive acceleration as a term from a setpoint engine speed at the static operating point, and a lower engine speed is obtained in the process.

In another aspect of the invention, during a subsequent acceleration procedure, the motor vehicle is accelerated with a fixed transmission ratio i until an upper setpoint engine speed is reached which lies above the setpoint engine speed at the static operating point by an amount equal to the deviation.

In still another aspect of the invention, the deviation is a function of the vehicle speed.

In yet another aspect of the invention, the deviation is a function of a driver evaluation generated by a fuzzy system.

In another aspect of the invention, the deviation is a function of a load evaluation of the vehicle generated by a fuzzy system.

In yet another aspect of the invention, the deviation rises from a minimum value to a maximum value.

In still another aspect of the invention, the deviation is used as a transmission jump in a manual mode of the speed transmission control system.

In one aspect of the invention, given positive acceleration of the motor vehicle, the change in the engine speed is adapted to the acceleration of the motor vehicle.

In another aspect of the invention, a control system for an infinitely variable automatic motor vehicle speed transmission, a circuit to generate adjustment characteristic curves, by which the transmission ratio of the speed transmission is set automatically as a function of the accelerator pedal position and of the vehicle speed, a control device with which the transmission ratio of the speed transmission is varied as required by manual intervention, and a circuit block by which the transmission ratio of the speed transmission is set as a stepped deviation from a setpoint engine speed.

BRIEF DESCRIPTION OF THE DRAWINGS

Exemplary embodiments of the invention are explained below with reference to the drawings, in which.

DETAILED DESCRIPTION OF THE INVENTION

In an infinitely variable operating mode of a CVT, the accustomed relationship between the variation of the engine speed and the acceleration of the vehicle does not exist. Because this relationship affects the driving pleasure of the driver, it appears appropriate to bring about this relationship even in a CVT, without giving up the main advantage of the free selection of the operating point.

A known electronic control system of a CVT reproduces the behavior of a six-speed multistep reduction gear into whose control system the driver can intervene manually by inputting gear shift instructions, and thus enhances driving pleasure (SAE Paper 9636321 Keiji SATO et al., Development of electronically controlled CVT system equipped with CVTip, SAE conference CVT'96, Yokohama). The behavior of a multi-step production gear is reproduced with a plurality of discrete gear speeds which are controlled by means of gear shift characteristic curves and diagrams. The disadvantage of such a solution is higher expenditure on adaptation because the gear shift characteristic curves and diagrams are defined with a very large number of individual points which have to be adapted to different variants of engines and motors at extremely high cost.

The invention is based on the technical problem of providing a method and a control system of the type mentioned at the beginning with which the association, to which the driver is accustomed, between the engine speed and the travel speed in a motor vehicle is produced without producing the rigid pattern of a multi-step reduction gear. This is to be made possible in particular taking into account the aforesaid setpoint operating point.

Figure 1:
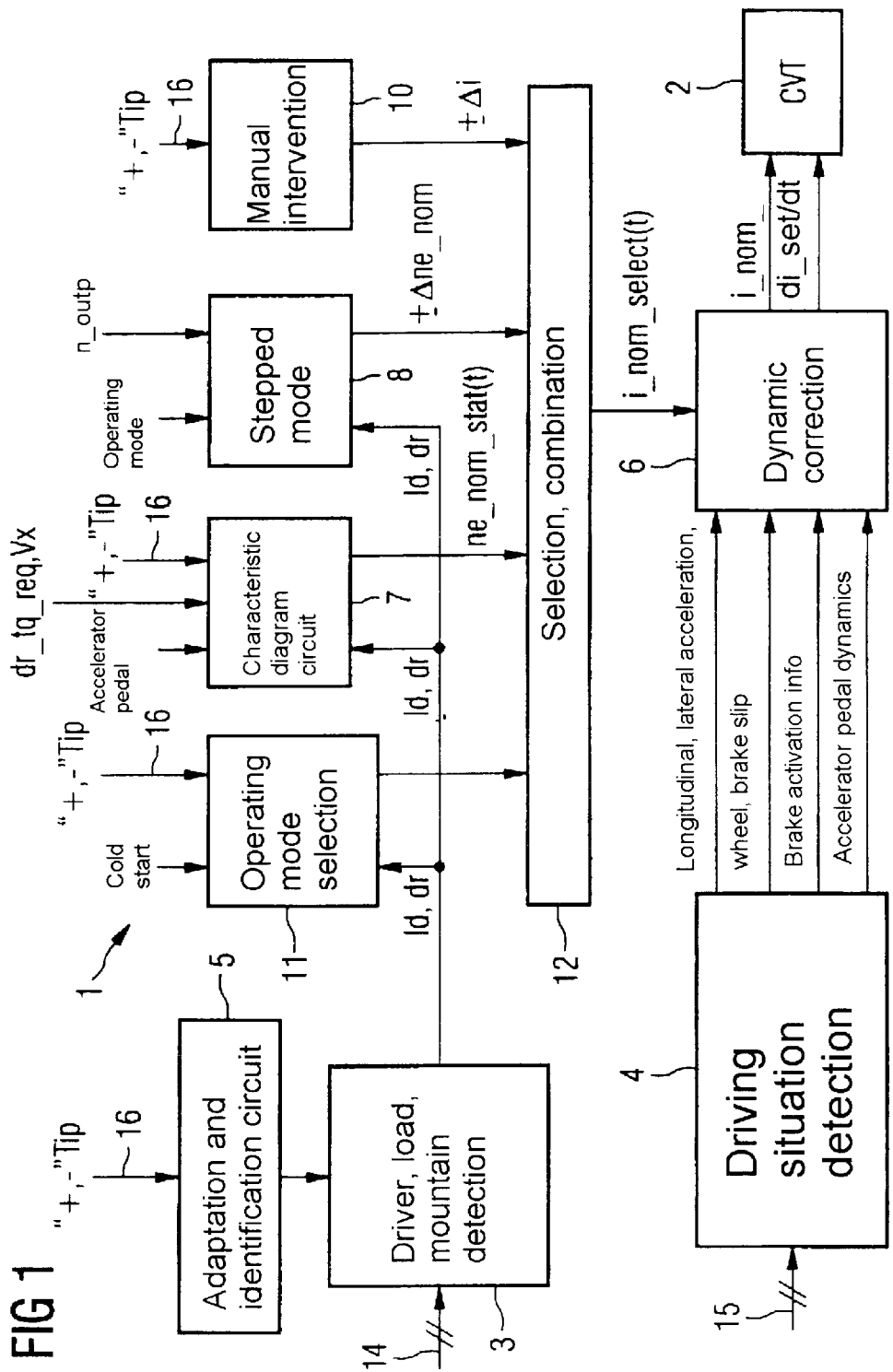
FIG. 1 shows a block circuit diagram of a speed transmission control system according to the invention.

The structure of a control system 1 according to the invention for an automatic CVT 2, referred to below as speed transmission control system 1, is shown in the block circuit diagram in FIG. 1. It includes a number of circuit components which are described below, which may also be implemented as program blocks and which are referred to in what follows as "block" in each case for reasons of simplification. In the individual blocks, the designations which are used for the program descriptions are given in brackets.

The speed transmission control system 1 includes first fuzzy systems 3 which carry out driver detection and load or mountain detection (driver, load, road), a second fuzzy system 4 which carries out driving situation detection, an adaptation and identification circuit 5 (online adaptation), a block 6 for exerting short-term influence in a number of short-term situations (dynamic corrections), and a characteristic diagram circuit 7 which includes or generates adjustment characteristic curves (static eng. speed setpoint lines). Furthermore, the speed transmission control system 1 includes a block 8 (stepped mode (automatic)) which associates the engine speed with the travel speed and thus implements a stepped operating mode, a block 10 (tip function (manual)) which implements direct manual interventions by the driver.

A block 11 which carries out an operating mode selection (driving mode selection) decides on the operating mode of the speed transmission control system together with a block 12 (selection, combination) which brings about logic combinations between the blocks 7, 8 and 10. Details on this, for example on how the manual mode of the speed transmission control system is detected and the return into the automatic mode takes place, are presented in co-pending application DE 197 36 406.3. The block 5 (online adaptation) is explained in co-pending application DE 197 52 623.3.

Figure 2:
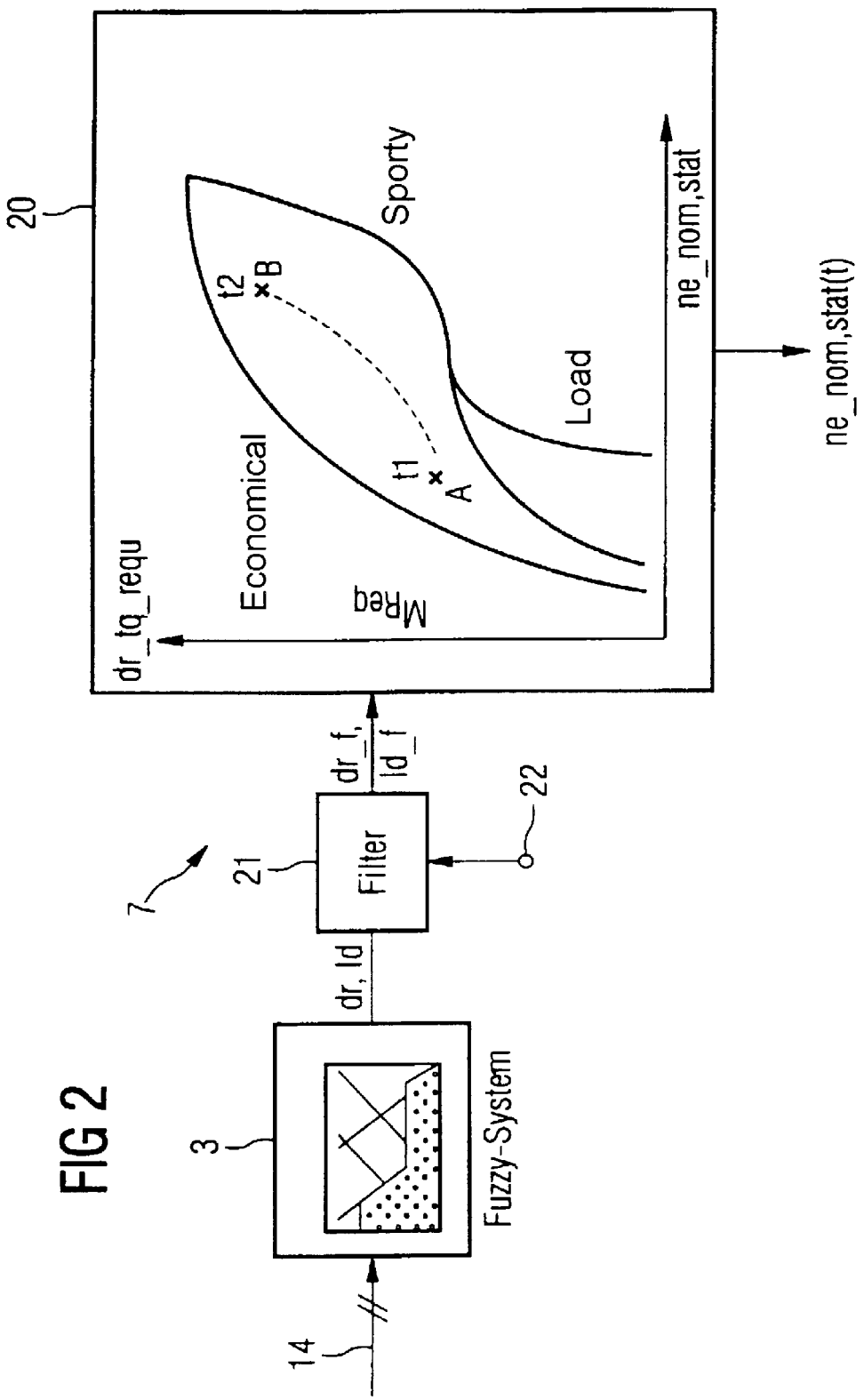
FIG. 2 shows a circuit arrangement for calculating a transmission ratio setpoint value.

The characteristic diagram circuit 7 includes a characteristic diagram superimposition circuit 20 (FIG. 2), to which the output signal of the fuzzy system 3 is fed, which output signal contains driver factors and load factors dr, ld (a list of the formula symbols used here is appended to the end of this description). The structure of the fuzzy system 3, the sensor signals evaluated by it and the output signal generated are described in application EP 0 576 703 A1. The output signal brings about, after filtering in a filter 21 in which particular operating conditions signaled via a line 22 can be taken into account, a superimposition of characteristic diagram data in the superimposition circuit 20 (static eng. speed setpoint lines), the characteristic diagram data being stored in a plurality of characteristic diagrams. The method of superimposition is carried out as described, for example, in co-pending application DE 197 52 623.3 mentioned above.

The characteristic diagram circuit 7, presented in simplified form until now, contains a characteristic diagram superimposition circuit 20 (FIG. 2), to which the output signal of the fuzzy system 3 is fed, which output signal contains driver factors and load factors dr, ld (a list of the formula symbols used here is appended to the end of this description). The structure of the fuzzy system 3, the sensor signals evaluated by it and the output signal generated are described in the application EP 0 576 703 A1. The output signal brings about, after filtering in a filter 21 in which particular operating conditions signaled via a line 22 can be taken into account, a superimposition of characteristic diagram data in the superimposition circuit 20 (static eng. speed setpoint lines), said characteristic diagram data being stored in a plurality of characteristic diagrams. The method of superimposition is carried out as described, for example, in the older application DE 197 52 623.3 mentioned above.

The speed transmission control system 1 adapts its gear shift behavior continuously to the driving behavior of the driver and to the load situation of the vehicle by selecting, with the values, calculated by the fuzzy system 3, for the driver's behavior dr and the load state ld in the superimposition circuit 20, a setpoint engine speed $ne\_nom\_stat(t)$ or a corresponding transmission ratio, i.e. an as-it-were virtual gear speed, by means of an interpolation between different characteristic diagrams.

If the driver does not agree with the gear shift behavior of the vehicle, he has, as mentioned, the possibility of shifting back a gear speed by means of a '−' key 16 of an input element using the block 10 (see FIG. 1), and shifting up a virtual gear speed ('tip function (manual)') by means of a '+' key 16.

The block 8, which controls the stepped mode of the gearbox control system 1, will now be described in more detail. A setpoint transmission ratio $i\_nom\_select$ which has been set, or is to be set, is specified and predefined, for example with the conditions "no cold start operating mode" or "manual interventions", by means of the blocks 7, 8, 11 and 12.

To do this, a setpoint engine speed supplied from the superimposition circuit 20 in block 7 at the static operating point $ne\_nom\_stat(t)$ or the resulting transmission ratio at the static operating point is modified. In the case of a positive acceleration of the vehicle, this setpoint engine speed $ne\_nom\_stat(t)$ from block 7 is modified by means of an additive term $\Delta ne\_nom$, resulting in a modified, lower engine speed $ne\_nom\_min$:

$$ne\_nom\_min = ne\_nom\_stat(t) - \Delta ne\_nom \qquad (1)$$

with respect to the current transmission ratio of $i\_nom\_select(t1)$ for the setpoint transmission ratio $i\_nom\_select$ (t2)

Provided that the transmission ratio is $i = n\_on/n\_off$, the following is obtained:

$$\text{i\_nom\_select}(t2)=\text{i\_nom\_stat}(t2)-\Delta I(t2)=\text{i\_nom\_stat}(t2)-\Delta ne\_nom/n\_off \quad (2)$$

Here, the speed transmission output speed n_off is generally available as a measured variable. If not, the equation (2) can be simplified given the assumptions $$n\_off=ne\_nom\_select(t1)/\text{i\_nom\_select}(t1) \quad (2a)$$

and $$\text{i\_nom\_select}(t1)=\text{i\_act}=\text{i\_nom\_stat}(t2) \quad (2b)$$

because $\Delta i=0$ at a time t1:

$$\text{i\_nom\_select}(t2)=\text{i\_act}*(1-\Delta ne\_nom/ne\_nom\_select(t1)) \quad (2c)$$

It is accordingly assumed that i_nom_stat remains constant, i.e. the driver's request remains unchanged.

Figure 3:
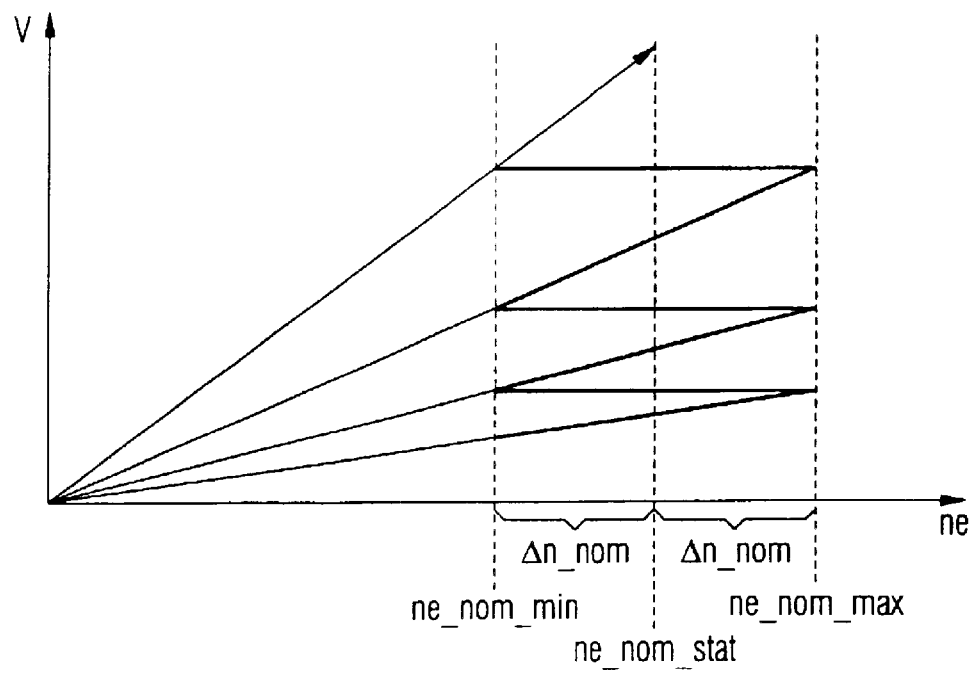
FIG. 3 shows the vehicle speed as a function of the engine speed for a speed transmission control system according to the invention.

In the following acceleration process, the vehicle accelerates with a fixed transmission ratio i until an upper setpoint engine speed ne_nom_max $$ne\_nom\_max=ne\_nom\_stat(t)+\Delta ne\_nom \quad (3)$$

is reached. After this rotational speed ne_nom_max has been reached, the transmission ratio i is adjusted according to equation (2) or (2c), with the result that the lower setpoint engine speed ne_nom_min is reached again. FIG. 3 shows an example of the profile of the engine speed ne and of the speed v of the motor vehicle given an acceleration process with a constant engine speed jump $\Delta ne\_nom$ and a setpoint engine speed at the static operating point ne_nom_stat(t) which clearly indicates the automatically stepped operating mode of the speed transmission control system 1.

The deviation $\Delta ne\_nom$ from the setpoint operating point ne_nom_stat(t) can be generally determined as a freely selectable function of, for example, the vehicle speed v, the driver evaluation dr and the load evaluation ld:

$$\Delta ne\_nom=f(v, dr, ld) \quad (4)$$

Figure 4:
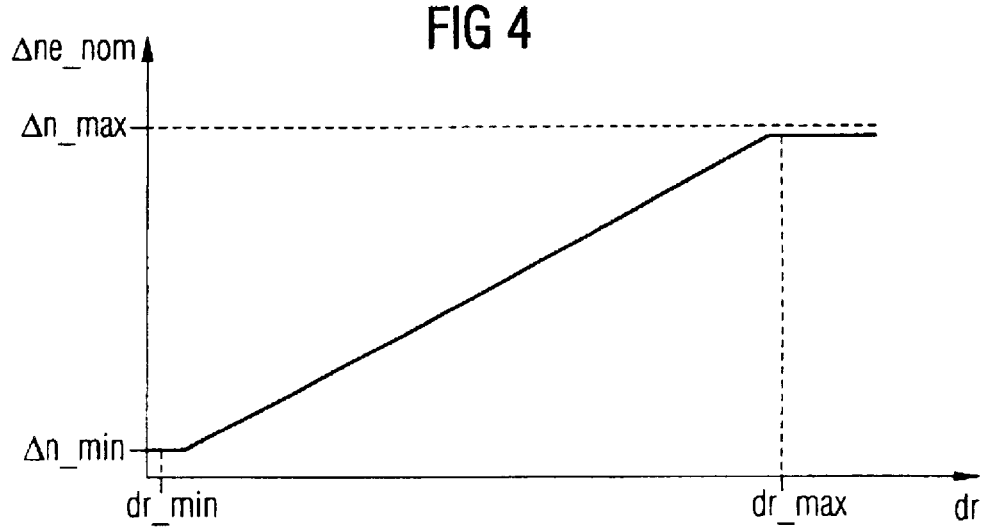
FIG. 4 shows a diagrammatic view of an engine speed jump used in the speed transmission control system according to FIG. 1.

Here, in the example shown in FIG. 4, the deviation $\Delta ne\_nom$ rises linearly between a minimum value $\Delta n\_min$, which corresponds to a minimum driver's value dr_min, and a maximum value $\Delta n\_max$, which corresponds to a maximum driver's value dr_max. Here, $\Delta n\_min$ corresponds to a minimum number of steps and $\Delta n\_max$ to a maximum number of steps, which is determined by the aimed-for number of virtual gear speeds of the speed transmission control system 1.

In addition, the number of steps $\Delta ne\_nom$ can be set during the operation of the speed transmission in the manual mode of the speed transmission control system as a transmission ratio jump when a manual intervention is made by the driver. The advantage of this feature lies in the fact that the current operating point is taken into account and it is not necessary to resort to a rigid transmission ratio table.

If the +/− key 16 or the gear shift lever (not illustrated) of the speed transmission 2 is touched only briefly, the transmission ratio is adjusted only by a constant value (gear speed jump). This manual intervention is detected by the block 16, and the block 12 calculates the setpoint transmission ratio i_nom_select(I):

$$\text{i\_nom\_select}(t)=\text{i\_nom\_stat}(t)+/-\Delta I \quad (5)$$

Figure 5:
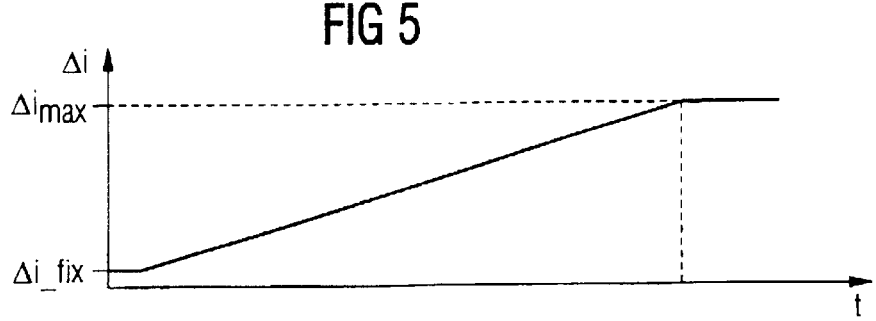
FIG. 5 shows a diagram explaining a manual intervention by the driver into the speed transmission control system.

If the key 16 or the gear shift lever is he activated persistently, there is a continuous intervention $\Delta i$ into the speed transmission ratio i (FIG. 5):

$$\text{i\_nom\_select}(t)=\text{i\_nom\_stat}(t)+/-\Delta i(t) \quad (6)$$

The interventions described above relate, as already mentioned, to the transmission setpoint value i_nom_stat calculated by the speed transmission control system. In this regard, the method disclosed in the abovementioned co-pending application DE 197 52 623.3 is carried out for interpolation between gear shift characteristic diagrams, only the gear shift characteristic curves (for multi-step reduction gears) Being replaced by adjustment characteristic curves (for continously variable speed transmissions). The characteristic diagram superimposition circuit 20 (see FIG. 2) shows an exemplary embodiment with an economical characteristic curve "eco-line", a sporty characteristic curve "perfo-line " and a load characteristic curve "load-line". characteristic diagram superimposition circuit 20 (see FIG. 2) shows an exemplary embodiment with an economical characteristic curve "eco-line", a sporty characteristic curve "perfo-line" and a load characteristic curve "load-line".

Figure 6:
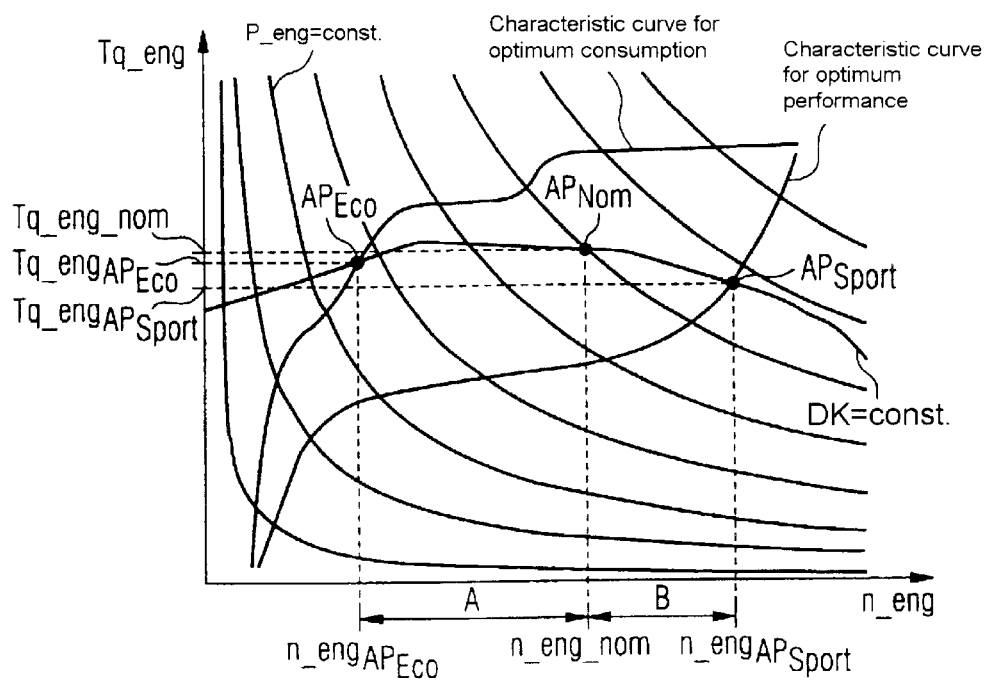
FIG. 6 shows a characteristic diagram of the CVT with direct control of the throttle valve of the motor vehicle by the driver.

The method for including a driver evaluation or load evaluation depends here on the configuration of the engine control system. By means of FIG. 6 a method is explained in which the driver controls the throttle valve DK, and thus the engine torque, directly. The calculation of the setpoint engine speed n_eng_nom (analogous to ne_nom_stat by means of FIG. 2) for a driver value DR where $$dr=A/(A+B) \quad (7)$$

is carried out by means of the interpolation between the setpoint engine speed $n\_eng_{APEco}$ for the operating point $AP_{Eco}$ which is optimum for consumption, and the setpoint engine speed $n\_eng_{APSport}$ for the operating point $AP_{Sport}$ which is performance-oriented.

In addition to the driver evaluation described above, the load state ld can be evaluated, the procedure being analogous and the operating points $AP_{Eco}$ and $AP_{Sport}$ being replaced here by $AP_{Nom}$ and $AP_{Load}$. The result obtained is a load operating point $AP_{Ld}$.

Symbols Used in Formulae:

| | |
|---|---|
| ne | Engine speed |
| ne_nom | Setpoint engine speed |
| ne_nom_min | Lower setpoint engine speed modified by -$\Delta ne\_nom$ |
| ne_nom_max | Upper setpoint engine speed modified by -$\Delta ne\_nom$ |
| ne_nom_stat | Setpoint engine speed at static operating point |
| ne_nom select | Setpoint engine speed which is set |
| $\Delta i$ | Variation of transmission ratio by manual intervention |
| $\Delta ne\_nom$ | Engine speed jump for stepped mode |
| $\Delta n\_min$ | Minimum engine speed jump |
| $\Delta n\_max$ | Maximum engine speed jump |
| i_nom_stat | Setpoint transmission ratio at operating point |
| i_nom_select | Setpoint transmission ratio which is set |
| i_act | Transmission ratio which is set |
| n_on | Speed transmission input speed |
| n_off | Speed transmission output speed |
| FP, tv | Accelerator pedal/throttle valve |
| v | Speed |
| dr | Driver evaluation (economical/sporty) |
| ld | Load evaluation (load/gradient of road) |
| dr_f | Filtered driver evaluation |
| ld_f | Filtered load evaluation |
| tq_eng | Engine torque |
| tq_eng_nom | Setpoint engine torque |
| tq_eng_stat | Engine torque at static operating point |

-continued

| | |
|---|---|
| tq_eng_req | Requested engine torque |
| P_eng | Engine output |
| P_eng_req | Requested engine output |
| n_eng | Engine output |
| n_eng_nom | Setpoint engine output |
| n_eng$_{APEco}$ | Setpoint engine speed at economical operating point |
| n_eng$_{APSport}$ | Setpoint engine speed at sporty operating point |
| AP$_{Eco}$ | Economical operating point |
| AP$_{Sport}$ | Sporty operating point |
| tq_eng$_{APEco}$ | Engine torque at economical operating point |
| tq_eng_APSport | Engine torque at sporty operating point |
| k | Correction factor for engine torque |
| F_man | Decay factor for correction in manual mode |
| F_auto | Decay factor for correction in automatic mode |
| dr_tq_req | Torque requested by driver |
| n_outp | Speed transmission output speed |
| M$_{req}$ | Requested torque |

What is claimed is:

1. A method for controlling an infinitely variable automatic motor vehicle speed transmission, comprising:
   automatically setting the transmission ratio of the speed transmission using stored adjustment characteristic curves as a function of a variable which characterizes the engine output, and a variable which characterizes the vehicle speed; and
   varying the transmission ratio by manual intervention by the driver, wherein
      the transmission ratio of the speed transmission is set as a stepped deviation from a setpoint engine speed.

2. The method as claimed in claim 1, wherein the deviation is subtracted in the case of a positive acceleration as a term from a setpoint engine speed at a static operating point, and a lower engine speed is obtained in the process.

3. The method as claimed in claim 2, wherein, during a subsequent acceleration procedure, the motor vehicle is accelerated with a fixed transmission ratio i until an upper setpoint engine speed is reached which lies above the setpoint engine speed at the static operating point by an amount equal to the deviation.

4. The method as claimed in claim 2, wherein the deviation is a function of the vehicle speed.

5. The method as claimed in claim 2, wherein the deviation is a function of a driver evaluation generated by a fuzzy system.

6. The method as claimed in claim 2, wherein the deviation is a function of a load evaluation of the vehicle generated by a fuzzy system.

7. The method as claimed in claim 2, wherein the deviation rises from a minimum value to a maximum value.

8. The method as claimed in claim 2, wherein the deviation is used as a transmission jump in a manual mode of the speed transmission control system.

9. The method as claimed in claim 2, wherein given positive acceleration of the motor vehicle, the change in the engine speed is adapted to the acceleration of the motor vehicle.

10. A control system for an infinitely variable automatic motor vehicle speed transmission, comprising:
    a circuit to generate adjustment characteristic curves, by which the transmission ratio of the speed transmission is set automatically as a function of the accelerator pedal position and of the vehicle speed;
    a control device with which the transmission ratio of the speed transmission is varied as required by manual intervention; and
    a circuit block by which the transmission ratio of the speed transmission is set as a stepped deviation from a setpoint engine speed.

11. The system as claimed in claim 10, wherein the deviation is subtracted in the case of a positive acceleration as a term from a setpoint engine speed at a static operating point, and a lower engine speed is obtained in the process.

12. The system as claimed in claim 11, wherein, during a subsequent acceleration procedure, the motor vehicle is accelerated with a fixed transmission ratio i until an upper setpoint engine speed is reached which lies above the setpoint engine speed at the static operating point by an amount equal to the deviation.

13. The system as claimed in claim 11, wherein the deviation is a function of the vehicle speed.

14. The system as claimed in claim 11, wherein the deviation is a function of a driver evaluation generated by a fuzzy system.

15. The system as claimed in claim 11, wherein the deviation is a function of a load evaluation of the vehicle generated by a fuzzy system.

16. The system as claimed in claim 11, wherein the deviation rises from a minimum value to a maximum value.

17. The system as claimed in claim 11, wherein the deviation is used as a transmission jump in a manual mode of the speed transmission control system.

18. The system as claimed in claim 11, wherein given positive acceleration of the motor vehicle, the change in the engine speed is adapted to the acceleration of the motor vehicle.

* * * * *